(12) United States Patent
Kallevig et al.

(10) Patent No.: US 7,093,415 B2
(45) Date of Patent: Aug. 22, 2006

(54) LAWN MOWER HAVING ADJUSTABLE FLOW CONTROL BAFFLE

(75) Inventors: Jeffrey B. Kallevig, Eden Prairie, MN (US); Randy L. Harris, Edina, MN (US); Stephen A. LaNasa, Champlin, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 10/608,715

(22) Filed: Jun. 23, 2003

(65) Prior Publication Data

US 2004/0255567 A1 Dec. 23, 2004

(51) Int. Cl.
*A01D 67/00* (2006.01)

(52) U.S. Cl. .......................... 56/320.2; 56/6
(58) Field of Classification Search .......... 56/6, 56/320.1, 320.2, 17.5
See application file for complete search history.

(56) References Cited

U.S. PATENT DOCUMENTS

| | | | |
|---|---|---|---|
| 4,055,036 A * | 10/1977 | Kidd | 56/13.6 |
| 4,226,074 A | 10/1980 | Mullet et al. | 56/320.2 |
| 4,890,446 A * | 1/1990 | Israel | 56/17.5 |
| 5,179,823 A | 1/1993 | Pace | 56/16.9 |
| 5,205,112 A | 4/1993 | Tillotson et al. | 56/2 |
| 5,465,564 A | 11/1995 | Koehn et al. | 56/320.2 |
| 5,499,495 A * | 3/1996 | Heisman et al. | 56/320.1 |
| 5,603,205 A * | 2/1997 | Foster | 56/16.7 |
| 5,628,171 A | 5/1997 | Stewart et al. | 56/320.2 |
| 5,845,475 A | 12/1998 | Busboom et al. | 56/320.1 |
| 5,987,863 A | 11/1999 | Busboom et al. | 56/320.1 |
| 6,192,666 B1 | 2/2001 | Sugden et al. | 56/320.2 |
| 6,609,358 B1 * | 8/2003 | Schmidt et al. | 56/320.2 |

* cited by examiner

*Primary Examiner*—Meredith Petravick
(74) *Attorney, Agent, or Firm*—Fulbright & Jaworski L.L.P.

(57) ABSTRACT

A mower deck having a plurality of cutting blades carried within a cutting chamber and having a plurality of flow control baffles positioned within the cutting chamber including a first flow control baffle being movably connected to the mower deck. The first flow control baffle being selectively movable between a pair of orientations within the cutting chamber during a mowing operation. In a preferred embodiment, the first flow control baffle may be positioned between the pair of orientations without access to the cutting chamber.

27 Claims, 5 Drawing Sheets

LAWN MOWER HAVING ADJUSTABLE FLOW CONTROL BAFFLE

BACKGROUND OF THE INVENTION

1. Field of the Invention

This invention relates to a lawn mower having multiple rotary cutting blades and more particularly to a lawn mower of the type described having one or more flow control baffles positioned at the underside of the mower deck.

2. Description of the Related Art

Commercial-type lawn mowers, whether they are walk-behind or riding mowers, normally include a mower deck having multiple rotary cutting blades positioned therein. Common classifications of mower decks include a mulching deck, a side discharge deck, a rear discharge deck or a bagging deck depending upon the manner in which the cut grass cuttings or clippings are handled or directed. When a mower is of the side discharge deck type, the grass clippings are discharged out one side of the deck and onto the ground. If the lawn mower is of the mulching deck type, the grass clippings are re-cut into finer particles and are then discharged directly down to the ground. Oftentimes, a mower is converted from a side discharge mower to a mulching mower and vice versa by changing certain of the deck baffles and the type of blade.

The prior art has previously provided flow control and mulcher baffles which are attached to the underside of the mower deck. Mulcher baffles maintain the clippings cut by each blade in an enclosed area around the blade so that the clippings are re-cut by the mulching blades and are directed down to the ground. In the prior art lawn mowers, the lawn mowers are only able to be converted to a mulching mower and vice versa through the labor-intensive and time-consuming installation of mulching baffles.

SUMMARY OF THE INVENTION

A multiblade lawn mower is described comprising a mower deck including a top wall, a front wall, a back wall and first and second side walls which define a downwardly directed cutting chamber. One of the side walls has a discharge opening formed therein so that the mower deck discharges grass clippings from one side thereof. The grass clippings may either be discharged from the discharge opening onto the ground or into some sort of collection container, bag or hopper. A plurality of cutting blades are rotatably disposed within the mower deck and are driven by a suitable power means. Flow control baffles are positioned within the mower deck and extend downwardly from the interior surface of the top wall of the mower deck. Flow control baffles function to control the movement of air and clippings within the mower deck.

When the mower is used as a side discharge mower, the flow control baffles efficiently direct the grass clippings toward the side discharge opening. When it is desired to convert the mower to a mulching mower, one or more of the flow control baffles may be removed and replaced with a plurality of removable mulcher baffles. Removable flow control baffles and mulcher baffles are also described in U.S. Pat. No. 5,987,863, incorporated by reference herein.

In a preferred embodiment, a selectively adjustable flow control baffle is provided forwardly of the cutting blades and proximate to the side discharge chute of the mower deck. The selectively adjustable flow control baffle may be manipulated by a user between at least a pair of operational positions. In one embodiment of the present invention, the selectively adjustable flow control baffle may be placed in at least three operational positions. The selectively adjustable flow control baffle is preferably user-adjustable by a mechanism accessible from a top surface of the mower deck. In a preferred embodiment, a selectively adjustable flow control baffle pivots about an axis generally perpendicular to the turf surface.

One object of the invention is to provide a multiblade, side discharge mower having flow control baffles including at least one selectively adjustable flow control baffle. Still another object of the invention is to provide a lawn mower of the type described wherein the selectively adjustable flow control baffle which may be quickly and easily accessed by a user. These and other objects will be apparent to those skilled in the art.

DESCRIPTION OF THE PREFERRED EMBODIMENT

Figure 1:
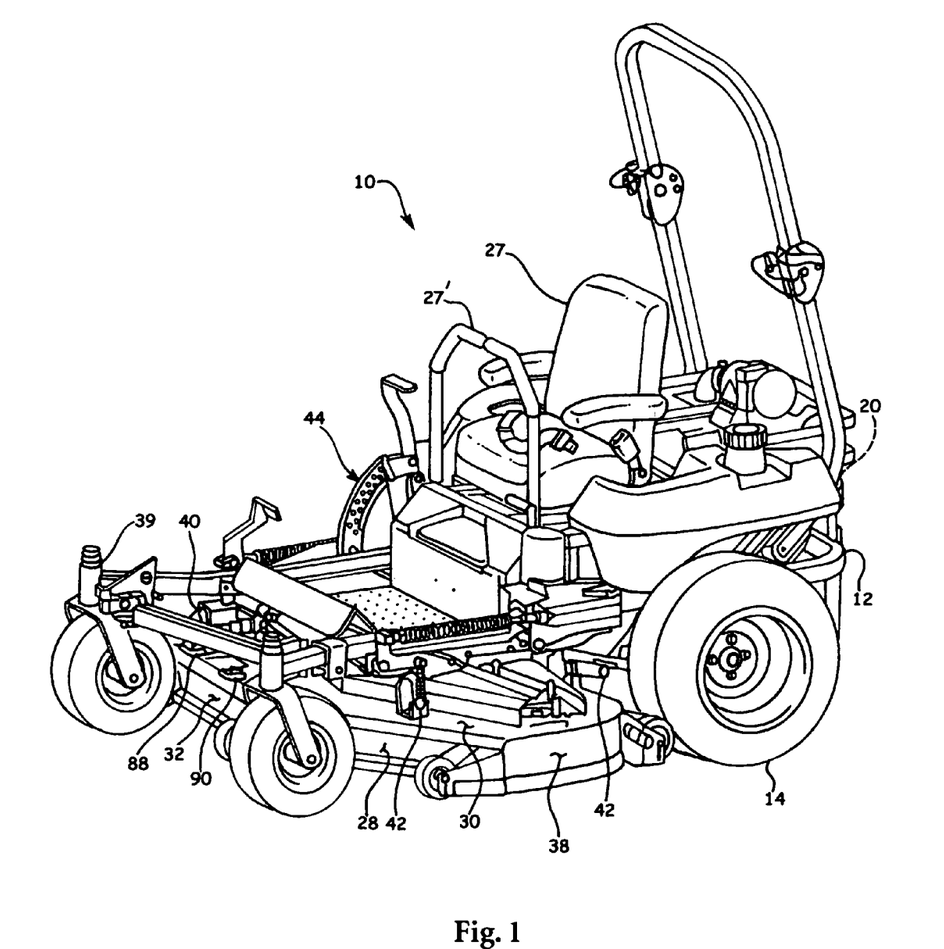
FIG. 1 is a front perspective view of a lawn mower having a front-mounted mower deck.

Referring to FIG. 1, the numeral 10 refers to a multiblade lawn mower upon which the invention herein is utilized. Although the invention described herein is ideally suited for use with a riding mower, it is believed that the invention described herein also has applicability with respect to walk-behind mowers. Mower 10 includes a frame 12 having a pair of drive wheels 14 positioned on opposite sides of the frame means 12 at the rearward end of the mower. An internal combustion engine 20 is mounted frame 12. Engine 20 is operatively connected to a pair of hydraulic pumps which are operatively connected to hydraulic motors operatively connected to the drive wheels 14, respectively. Mower 10 also includes an operator's station 27 and steering controls 27'.

Mower 10 includes a mower deck 28 at the forward end thereof which includes a top wall 30, front wall 32, rear wall 34 (not shown in FIG. 1), and opposite side walls 36 and 38. Caster wheel assemblies 39 support the forward end of deck 28. A stabilizer rod assembly connects the rearward end of the mower deck 28 to the frame means 12 in conventional fashion. Mower deck 28 is supported by a plurality of chain members 42 which are connected to a mower deck height control mechanism generally referred to by the reference numeral 44 to enable the mower deck to be raised or lowered with respect to the frame means 12.

Figure 2:
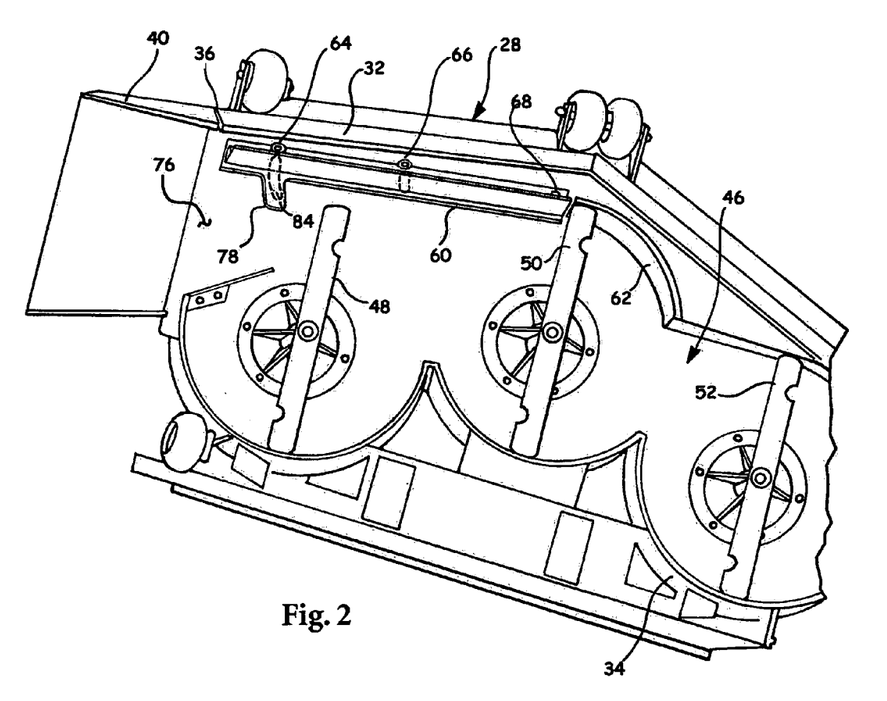
FIG. 2 is an bottom perspective view of the mower deck of FIG. 1 illustrating the selectively adjustable flow control baffle in a first operational position.
Figure 3:
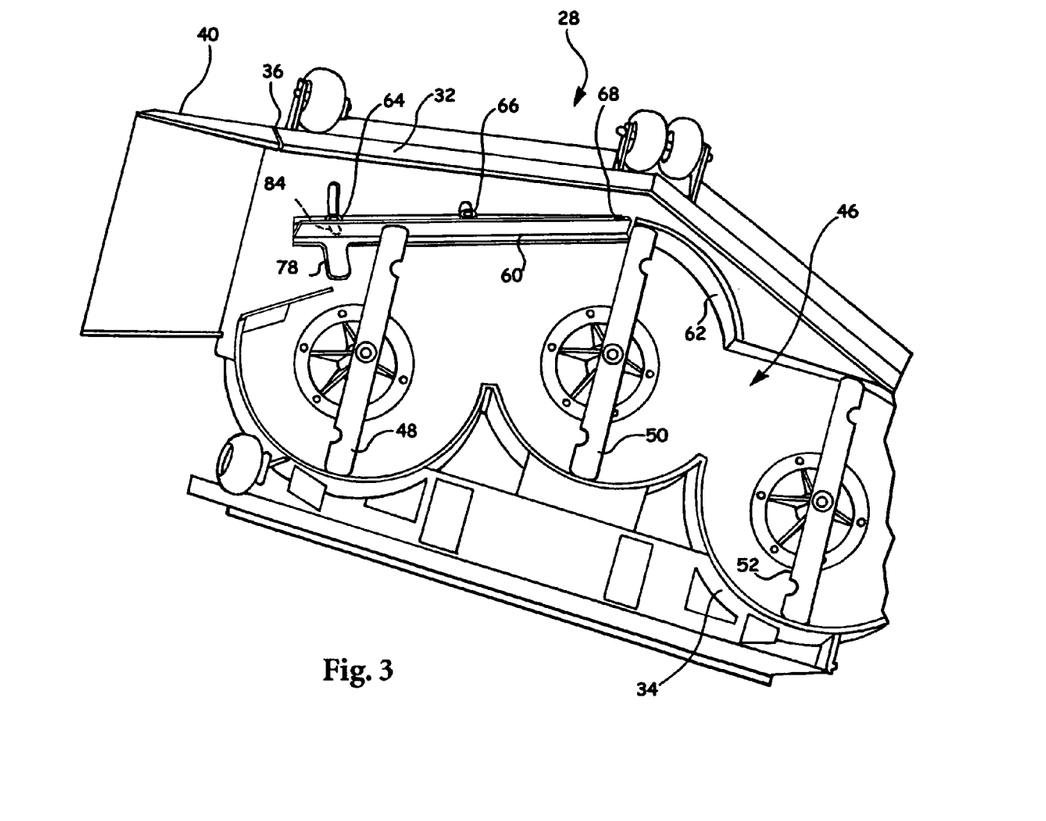
FIG. 3 is an bottom perspective view of the mower deck of FIG. 1 illustrating the selectively adjustable flow control baffle in a first operational position.

Additional details of mower deck 28 are shown in FIGS. 2 and 3. Cutting deck 28 includes a downwardly facing cutting chamber 46 which is defined by shroud walls 32, 34, 36, and 38 that extend downwardly from top wall 30. As is well known in rotary cutting decks, this wall arrangement provides a generally enclosed cutting chamber which is enclosed over the sides and top thereof but is open at the bottom thereof. Rotary cutting blades 48, 50, 52 are carried inside cutting chamber 46 and rotate in a generally horizontal cutting plane about a generally vertical rotational axis. Each rotary cutting blade 48, 50, 52 has sharpened cutting edges which cut the grass as blade rotates in its cutting plane. The height of cut is determined by how far the blades are positioned above the ground which is, in turn, determined by the relative position of cutting deck 28. A means for rotating the cutting blade within cutting chamber is provided on cutting deck 28. This rotating means may comprise a pulley system. Alternatively, an individual electric or hydraulic motor may be utilized to power the cutting blades. Shroud wall 36 is provided with a grass discharge opening to allow grass clippings to exit through shroud wall 36 in some desired direction, i.e. to the side of cutting deck as shown in FIG. 1 or to the rear of cutting deck 28. A side discharge chute 40 is provided. One such side discharge chute is disclosed in U.S. Ser. No. 10/444,663, entitled "Resilient Discharge Directing Chute" and incorporated by reference herein.

Rear wall 34 of mower deck 28 is configured as a series of semi-circular portions each associated with one of the cutting blades 48, 50, 52. Flow control baffles 60, 62 are provided in the area between front wall 32 and cutting blades 48, 50, 52. Flow control baffles 60, 62 are preferably metal elements having portions that extend approximately to the blade cutting plane. Flow control baffle 60 is secured to mower deck 28 by threaded fasteners 64, 66, 68. Flow control baffle 62 is also secured to mower deck 38 by threaded fasteners. Other approaches to securing flow control baffles 60, 62 to mower deck 28 would be appreciated by those of ordinary skill in the art. For example, in another embodiment of the invention one or more flow control baffles may be welded to mower deck 28. Flow control baffles 60, 62 are preferably in generally vertical alignment with the turf surface. In alternative embodiments, flow control baffles may include inclined surfaces, apertures, or other structure.

Figure 4:
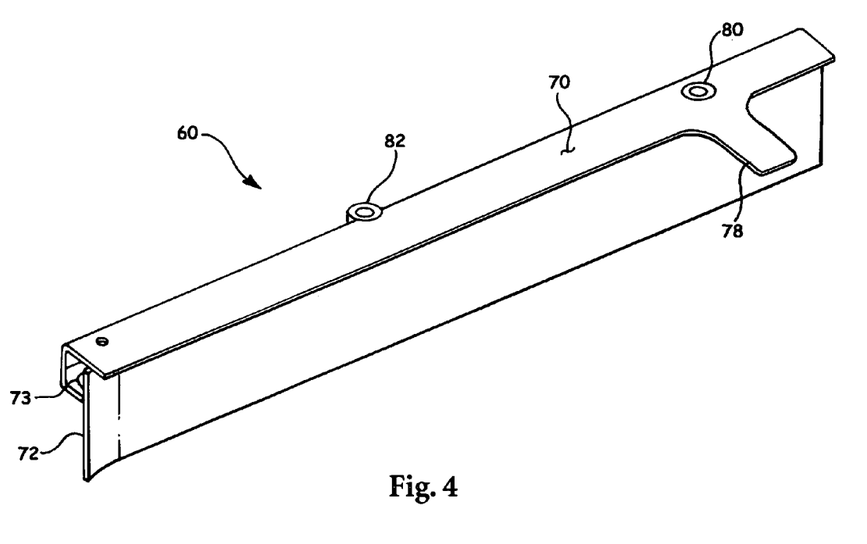
FIG. 4 is a perspective view of the selectively adjustable flow control baffle removed from the mower deck.

Flow control baffle 60 is movably secured to mower deck 28 by threaded fasteners 64, 66, 68. As described in more detail herein, the position of flow control baffle 60 within cutting chamber 46 is selectively adjustable. Details of flow control baffle 60 are provided in FIG. 4. Flow control baffle 60 includes a top surface 70 and a side surface 72. Flow control baffle 60 includes an elongated box-shaped reinforcement structure 73 between top surface 70 and side surface 72. The box-shaped reinforcement structure 73 provides additional strength and rigidity to flow control baffle 60. When installed in mower deck 28, top surface 70 engages a top inner surface 76 of mower deck 28. An ear 78 is defined in top surface 70. Flow control baffle 60 includes a pair of elements 80, 82 having interior threads which engage part of threaded fasteners 64, 66.

Figure 5:
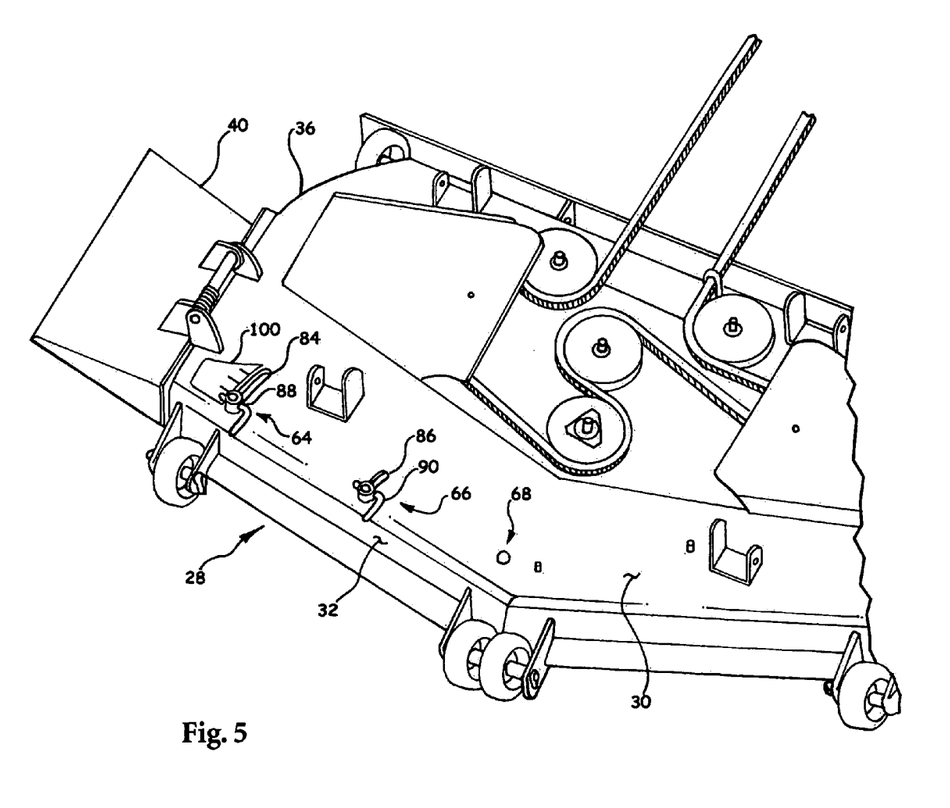
FIG. 5 is a front perspective view of a mower deck having a selectively adjustable flow control baffle.

As shown in FIGS. 1 and 5, top wall 30 of mower deck 28 includes a pair of semi-circular slots 84, 86 each receiving a corresponding portion of threaded fasteners 64, 66. Slots 84, 86 define a range of motion for flow control baffle 60. Slots 84, 86 are sized to permit a range of motion to flow control baffle 60 and restrict the flow control baffle 60 from being adjusted into contact with mower blade 48. A pair of cam locking elements 88, 90 are used to selectively secured flow control baffle 60 within mower deck 28. Cam locking elements 88, 90 form part of threaded fasteners 64, 66. Ear 78 of flow control baffle 60 is aligned with slot 84 so as to limit the escape of grass clippings through slot 84. As described in more detail hereinafter, cam locking elements 88, 90 may be loosened to permit flow control baffle 60 to pivot about fastener 68. Cam locking elements 88, 90 each include a graspable handle which may be rotated to either tighten or loosen fasteners 64, 66. Those of ordinary skill in the art would appreciate that a variety of different fasteners and/or locking mechanisms may be utilized to movably secure flow control baffle 60 to mower deck 62. For example, hand-graspable threaded wheels may be utilized in place of cam locking elements 88, 90.

Referring to FIG. 5, indicia 100 is provided on top wall 30 of mower deck 28. Indicia 100 provides visual positioning information to a user and may be an affixed label or may be embossed or otherwise imprinted on top wall 30 of mower deck 28. Cam locking element 88 moves relative to indicia 100 as flow control baffle 60 is moved between positions providing a reference to baffle 60 position. Indicia 100 may include recommend setting information so that the user may be prompted to position flow control baffle 60 based on anticipated turf conditions.

Flow control baffles 60, 62 are removable attached to mower deck 28. Deck 28 may be converted between a side discharge deck (as illustrated) into a mulching deck by removing flow control baffles 60, 62 and inserting front mulching baffles and bridging elements (not shown) between the front mulching baffles and rear wall 34.

The operation of the preferred embodiment will be described. In general, as cutting blades 48, 50, 52 are rotated, some of the grass cuttings created by cutting blade 52 are directed toward side discharge chute 40 by portions of baffle 62. Similarly, some of the grass cuttings created by cutting blade 50 are directed toward side discharge chute 40 by another portion of baffle 62. Some of the grass cuttings created by all cutting blades 48, 50, 52 will interact with baffle 60. The degree of interaction between the grass cuttings and baffle 60 depends on the relative position of baffle 60 within mower deck 28.

The relative position of flow control baffle 60 within mower deck 28 can be control by a user. Before or during a mowing operation, a user may selectively position flow control baffle 60 within mower deck 28 by accessing fasteners 64, 66. Upon loosening fasteners 64, 66 via manipulation of cam-locks 88, 90, flow control baffle 60 may be biased into a different position by applying a force to the head portions of fasteners 64, 66. The range of motion of flow control baffle is limited by the length of slots 84, 86. Reference may be made to indicia 100 during a change from one position to the next. Indicia 100 may include hash marks or numbering to assist in positioning. Indicia 100 also includes suggested baffle 60 positions based on mowing conditions. For example, FIG. 2 illustrates flow control baffle 60 in a first position. Such a position may be desirable during mowing operations under wet conditions, tall and/or dense grass conditions, or while in a maximum ground speed condition. In comparison, FIG. 3 illustrates flow control baffle 60 in a second position. Such a position may be useful when operating the mower in short and light grass conditions, dry conditions, or where maximum dispersion of clippings is desired. An intermediate position between the first position of FIG. 2 and the second position of FIG. 3 may be useful during bagging operations. Fasteners 64, 66 are tightened via cam-locks 88, 90 to secure flow control baffle 60 at a desired position. During mower operation, it may be useful to adjust the position of flow control baffle 60 as conditions change. As described, the user is able to efficiently control the position of flow control baffle 60 within mower deck 28 by accessing fasteners 64, 66.

Other variants are possible without departing from the scope of the present invention. For example, more than one adjustable flow control baffle may be utilized, or the baffles 60, 62 may be differently shaped to achieve additional cutting performance. Thus, the scope of this invention is to be limited only by the appended claims.

We claim:

1. A mower deck, comprising:
a cutting chamber defined by a top wall, a front wall and plurality of side walls including a first side wall defining a side discharge opening of the mower deck for dispersion of grass clippings away from the mower deck;
a plurality of cutting blades positioned within the cutting chamber, including a central cutting blade and a pair of side cutting blades, each cutting blade defining a circular blade tip path; and
a plurality of flow control baffles positioned within the cutting chamber including a first flow control baffle being movably connected to the mower deck, said first flow control baffle being selectively movable between a pair of orientations within the cutting chamber, said first flow control baffle defining a movable wall having a first end proximate to the side discharge opening and a second end further within the cutting chamber and ahead of the central cutting blade during forward movement of the mower deck, said first flow control baffle laterally extending in front of substantially the entire blade tip path of one of the side cutting blades and in front of at least a portion of the blade tip path of the central cutting blade,
and said first end being movable relative to the side discharge opening to control a flow of grass clippings out of the side discharge opening of the mower deck.

2. The mower deck of claim 1, wherein the plurality of flow control baffles further includes a stationary baffle having a semicircular portion.

3. The mower deck of claim 1, wherein the first flow control baffle is attached to the mower deck by at least one threaded fastener.

4. The mower deck of claim 1, wherein the first flow control baffle is attached to the mower deck by at least one fastener having a portion thereof which is accessible at an upper surface of the top wall of the mower deck.

5. The mower deck of claim 4 wherein the at least one fastener is received within a slot in the top wall of the mower deck.

6. The mower deck of claim 5 wherein the slot defines a range of motion of the first flow control baffle and restricts the first flow control baffle from contact wit one or more of the plurality of cutting blades.

7. The mower deck of claim 5 wherein the first flow control baffle includes an ear element which minimizes a flow of grass clippings through the slot.

8. The mower deck of claim 4, wherein the at least one fastener includes a cam lock.

9. The mower deck of claim 8, wherein the first flow control baffle is selectively secured to the mower by a pair of cam locking threaded fasteners.

10. The mower deck of claim 1 wherein the first flow control baffle pivots between the pair of orientations within the cutting chamber.

11. The mower deck of claim 1 wherein the first flow control baffle is generally linear in form.

12. The mower deck of claim 11 wherein the first flow control baffle includes an elongated box-shaped reinforcement structure.

13. The mower deck of claim 1 further comprising:
indicia providing information related to at least the pair of orientations of the first flow control baffle within the cutting chamber.

14. The mower deck of claim 1 wherein the first flow control baffle is attached to the mower deck by at least one fastener having portion thereof which is accessible at an upper surface of the top wall of the mower deck, and wherein an indicia related to a pair of orientations of the first flow control baffle is provided at a location proximate to said at least one fastener.

15. The mower deck of claim 1 wherein the first control baffle has a length measured between a pivot point and an opposite end which is greater than a length of the cutting blades.

16. A method comprising the steps of:
providing a mower deck having a top wall and a plurality of other walls together defining a cutting chamber, said mower deck having a side discharge opening through which grass clippings are thrown away from the mower deck, and said mower deck having three cutting blades within the cutting chamber including a central cutting blade and a pair of side cutting blades, with each cutting blade having a generally circular cutting blade tip path;
securing a flow control baffle within the cutting chamber at a first position with fasteners accessible at the top wall, said first control baffle extending into the cutting chamber toward a center of the central cutting blade and ending proximate to the side discharge opening, and said first flow control baffle laterally extending in front of substantially the entire blade tin path of one of the side cutting blades and in front of at least a portion of the blade tip path of the central cutting blade;
loosening the fasteners securing the flow control baffle;
moving the flow control baffle to a second position within the cutting chamber; and
securing the flow control baffle at the second position by tightening the fasteners.

17. The method of claim 16 further comprising:
determining a turf condition and then moving the flow control baffle to the second position based on the turf condition.

18. The method of claim 16 further comprising:
referring to an indicia on the mower deck including information related to the first and second positions of the flow control baffle within the cutting deck.

19. The method of claim 16 wherein the fasteners include threaded portions and cam locking portions.

20. The method of claim 16 wherein the flow control baffle pivots within the cutting chamber between the first position and the second position.

21. A turf cutting deck comprising:
a top wall, a front wall, a back wall, and at least one side wall, together defining a downwardly directed cutting chamber;
a side discharge opening through which grass clippings are thrown away from the turf cutting deck;
a plurality of cutting blades within the cutting chamber including a central cutting blade and a pair of side cutting blades and each having a blade tip path; and
a plurality of flow control baffles contained within the cutting chamber, at least one of the plurality of flow control baffles having an accurate portion which extends partially around a blade tip path, and at-least one of the flow control baffles being selectively movable between a pair of orientations within the cutting chamber and having a movable end proximate to the side discharge opening of the cutting chamber and another end further within the cutting chamber toward a center of the central cutting deck, said one flow control baffle laterally extending in front of substantially the entire blade tip path of one of the side cutting blades and in front of at least a portion of the blade tip path of the central cutting blade and controlling a flow of grass clippings through the side discharge opening of the turf cutting deck.

22. The turf deck of claim 21 further comprising positioning indicia visible to a user from above the cutting deck, said positioning indicia indicating a range of positions of the selectively movable flow control baffle within the cutting chamber.

23. The turf cutting deck of claim 21, wherein the selectively movable flow control baffle is attached to the mower deck by at least one threaded fastener having a portion thereof which is accessible front above the cutting deck.

24. The turf cutting deck of claim 23, wherein the at least one fastener includes a cam lock.

25. The turf cutting deck of claim 21 wherein the selectively movable flow control baffle pivots between within the cutting chamber.

26. The turf cutting deck of claim 21 wherein the selectively movable flow control baffle includes a first end located proximate to a centerline of the cutting deck and a second end located proximate to a side discharge chute.

27. The turf deck of claim 21 wherein the at least one of the flow control baffles has a length measured between a pivot point and an opposite end which is greater than a length of the cutting blades.

* * * * *

UNITED STATES PATENT AND TRADEMARK OFFICE
CERTIFICATE OF CORRECTION

| | | |
|---|---|---|
| PATENT NO. | : 7,093,415 B2 | Page 1 of 1 |
| APPLICATION NO. | : 10/608715 | |
| DATED | : August 22, 2006 | |
| INVENTOR(S) | : Jeffrey B. Kallevig et al. | |

It is certified that error appears in the above-identified patent and that said Letters Patent is hereby corrected as shown below:

In the claims,
at claim 6, line 3, delete "wit" and insert --with--;
at claim 16, line 17, delete "tin" and insert --tip--;
at claim 21, line 13, delete "at least";
at claim 23, line 4, delete "front" and insert --from--.

Signed and Sealed this

Twenty-eighth Day of November, 2006

JON W. DUDAS
*Director of the United States Patent and Trademark Office*